(12) United States Patent
Schupies et al.

(10) Patent No.: US 7,798,717 B2
(45) Date of Patent: Sep. 21, 2010

(54) SPACER

(75) Inventors: Andreas Schupies, Boehlen (DE);
Stefan Dorn, Arnstein (DE); Carsten Pfeuffer, Roethlein (DE)

(73) Assignee: Robert Bosch GmbH, Stuttgart (DE)

( * ) Notice: Subject to any disclaimer, the term of this patent is extended or adjusted under 35 U.S.C. 154(b) by 422 days.

(21) Appl. No.: 11/946,116

(22) Filed: Nov. 28, 2007

(65) Prior Publication Data

US 2008/0124010 A1    May 29, 2008

(30) Foreign Application Priority Data

Nov. 28, 2006 (DE) .................. 10 2006 056 087

(51) Int. Cl.
*F16C 29/06* (2006.01)
(52) U.S. Cl. .......................... 384/44; 384/51
(58) Field of Classification Search ........... 384/44, 384/51
See application file for complete search history.

(56) References Cited

U.S. PATENT DOCUMENTS 3,937,532 A    2/1976    Fuhrmann et al.

2006/0120637 A1    6/2006    Kuwabara

FOREIGN PATENT DOCUMENTS

| DE | 24 16 198 | 10/1975 |
|---|---|---|
| DE | 42 11 400 | 10/1993 |
| DE | 20 2004 001 812 | 4/2004 |
| EP | 1 403 541 | 3/2004 |
| EP | 1 677 016 | 7/2006 |

*Primary Examiner*—Thomas R Hannon
(74) *Attorney, Agent, or Firm*—Michael J. Striker

(57) ABSTRACT

A spacer for roller bodies, which are guided in a roller bearing and which have an axis of symmetry and have an axis of symmetry, defining a rolling axis, about which they roll in a revolution path of the roller bearing, includes two diametrically opposed, spaced-apart end parts, which are each located transversely to the direction of motion of the roller bodies and have contact faces for rolling faces of the roller bodies; two diametrically opposed, spaced-apart lateral parts, and each of the lateral parts connects the two end parts, has a platelike shape, with a flat side, extending transversely to the rolling axis of the roller bodies, for contact with the roller bodies, and short sides extending substantially in the direction of the rolling axis of the roller bodies, and is stiffened with regard to bending essentially orthogonally to the rolling axis of the roller bodies in such a way that in its motion along the revolution path, it essentially maintains its shape; and at least one rib, connecting the two lateral parts between the two end parts, which rib has contact faces for the rolling faces of two successive roller bodies.

20 Claims, 8 Drawing Sheets

SPACER

CROSS-REFERENCE TO A RELATED APPLICATION

The invention described and claimed hereinbelow is also described in German Patent Application DE 10 2006 056 087.6 filed on Nov. 28, 2006. This German Patent Application, whose subject matter is incorporated here by reference, provides the basis for a claim of priority of invention under 35 U.S.C. 119(a)-(d).

BACKGROUND OF THE INVENTION

The present invention relates to a spacer for roller bodies, which are guided in a roller bearing, in particular a linear guide, and which have an axis of symmetry about which they roll in a revolution path of the roller bearing. The invention furthermore relates to a linear device having such spacers.

In roller bearings, for noise abatement and to improve the rolling behavior of the roller bodies, the attempt is made to guide the roller bodies by means of suitable guide structures, such as cages, which are intended to prevent the roller bodies from entering into direct contact with one another, or to prevent overly great spacings from occurring between the roller bodies. In roller bodies that have an axis of symmetry which defines their rolling axis, it is furthermore important to avoid tilting of the axes of symmetry of the roller bodies relative to one another during their rolling motion.

The term linear devices should be understood to mean in particular linear guides and linear drives. It is characteristic for a linear guide or a linear drive that revolution path of the roller bodies alternates between rectilinear and curved portions, or between portions of variously pronounced curvature. This makes it especially problematic to guide roller bodies by suitable guide structures, since on the one hand a certain rigidity of the guide structure is required for good guidance, but on the other, because of the different path radii, sufficient flexibility of the guide structure is necessary, and therefore completely rigid cages, of the kind that are usual with roller bearings, cannot be considered.

In the prior art, various principles for guiding roller bodies in linear guides have been considered. On the one hand, it is known to discard the concept of a cage entirely and to separate the roller bodies from one another only by means of spacer bodies, preferably made from plastic, that are located loosely between the roller bodies. Such an arrangement is intrinsically incapable of preventing the spacings between the roller bodies from increasing in certain situations. If these spacings become too great, there is the danger that the spacer bodies will become jammed. Moreover, such different spacings of the roller bodies contribute to noise production. In the case of roller- or barrel-shaped roller bodies, there is the additional problem that as a result of forces acting on the roller bodies as they revolve, they rolling axes of the roller bodies, which are defined by the axis of symmetry of the roller bodies, relative to one another will tilt, which cannot be prevented by loose spacer bodies. The roller bodies themselves must therefore be guided by their face ends on the boundary walls of the revolution path.

From German Utility Model DE 20 2004 001 812 U1, it is for instance known to support rollers of a linear guide individually in a pocket. The pocket is formed by two separator elements, resting on the rolling faces of the rollers, that are connected on the sides by a curved tension belt that is guided past the face ends of the rollers.

To improve the guidance of the roller bodies, German Patent Disclosure DE 24 16 198, for roller-shaped roller bodies, proposes located two successive rollers together in an intrinsically rigid sheet-metal retaining element. This retaining element, on its face ends, has the cylindrical contours of the contact faces, which are adapted to the rolling faces of the rollers and are connected by two bracketlike guide parts. The sheet-metal guide parts are shaped such that they provide for the requisite rigidity of the retaining element and also prevent bending both in the direction of the rolling axis of the roller bodies and bending transversely to the rolling axis of the roller bodies. They are furthermore connected to one another by a rib that separates the two successive rollers from one another.

The guide parts rest with a short side on the face ends of the rollers inserted into the retaining element, and they engage a guide groove of the revolution path. The individual retaining elements follow one another loosely in the revolution path. Because of the rigid guidance of two rollers, for the same play of the guide parts in the guide groove, a smaller tilt angle of the rolling axes is attained than if the rollers are guided individually.

Alternatively, for better guidance of roller bodies in linear devices, it is proposed that the roller bodies be guided by flexible connecting elements on the order of a chain of roller bodies. The roller body chain is formed by a flexible connection belt, in which pockets are formed for receiving the individual roller bodies. For a better hold of the roller bodies in the pockets, as a rule retention shells, adapted to the contours of the rolling faces of the roller bodies, are formed on the face ends of the pockets. The flexibility of the connecting belt makes it possible for the belt to adapt its bend if the radius of curvature of the revolution path changes. For that purpose, it can additionally be guided in a guide groove (see for instance European Patent Disclosure EP 1 403 541 B1). A problem with roller body chains is in particular the adjustment of the most uniform possible bend of the connecting belt, above all for short deflection radii. The flexibility of the connection belt is therefore of decisive significance.

Finally, from US Patent Disclosure 2006/0120637 A1, it is known to shorten the length of a roller chain enough that only two pockets for rollers to be received are embodied in the flexible connection belt, so that even narrow deflection radii can be made possible. Because of the short length of the chain and the flexibility of the connection belt, however, in this embodiment a certain tilt of the roller axes to one another must be accepted into the bargain.

A further variant of a cage for a linear guide is shown in German Patent DE 42 11 400 C2. In this variant, the cage is made up individual members that are joined to one another in articulated fashion. From a middle rib part of each chain link, two tab parts extend orthogonally to each side. The roller bodies are supported in a pocket that is formed by slipping the tab parts, to be oriented toward one another, of two chain links onto one another and locking them at a pivot point. Although by means of this chain a fixation of the spacings of successive roller bodies is possible, nevertheless, because of the unavoidable play between two successive chain parts, guidance of the roller bodies in such a way as to avoid tilting of the rolling axis is not possible.

SUMMARY OF THE INVENTION

The object of the invention is to create a spacer which is rigid enough to avoid tilting of the rolling axis of roller bodies yet nevertheless assures adequate stability and furthermore can be manufactured economically.

According to the invention, this object is attained in that a spacer of the type defined has two diametrically opposed, spaced-apart end parts, which are each located transversely to the direction of motion of the roller bodies and have contact faces for rolling faces of the roller bodies; two diametrically opposed, spaced-apart lateral parts, of which each of the lateral parts connects the two end parts, has a platelike shape, with a flat side, extending transversely to the rolling axis of the roller bodies, for contact with the roller bodies, and short sides extending substantially in the direction of the rolling axis of the roller bodies, and is stiffened with regard to bending essentially orthogonally to the rolling axis of the roller bodies in such a way that in its motion along the revolution path, it essentially maintains its shape; and at least one rib, connecting the two lateral parts between the two end parts, on which rib contact faces for the rolling faces of two successive roller bodies are formed.

The roller bodies, which for instance are roller- or barrel-shaped, roll in their motion along the revolution path about a rolling axis extending perpendicular to their direction of motion; this rolling axis coincides with their axis of symmetry. The end parts of the spacer therefore extend essentially parallel to the rolling axis of the roller bodies. The connection of the two end parts defines a longitudinal direction of the lateral parts. The lateral parts extend essentially in the direction of motion of the roller bodies, specifically each on diametrically opposite sides of their revolution path. Thus by means of the end parts and the lateral parts, an annularly closed structure is formed, which forms a pocket for receiving roller bodies.

The lateral parts rest on lateral end faces of the roller bodies inserted into the spacer. Along their short sides, they protrude laterally in the direction of motion of the roller bodies and can therefore, if desired, be guided in a guide groove machined laterally into the boundary of the revolution path.

Because of their platelike shape, in the spacer embodied according to the invention, the lateral parts themselves are resistant to bending orthogonally to the rolling axis of the roller bodies. The particular consequence of this is that the lateral parts on passing through a curved portion of the revolution path, for instance at the two deflection curves in a linear guide, do not change their shape—at least in a projection along the rolling axis. Because of their thinner short sides, however, the lateral parts are entirely flexible with regard to bending essentially in the direction of the rolling axis. Thus the spacer is intrinsically also relatively flexible with regard to bending in that direction. Precisely such bending forces, however, are a cause of the aforementioned tilting of the rolling axes of the roller bodies to one another and should therefore likewise be suppressed. It is the accomplishment of the inventors of the present invention to have recognized the fact that accomplishing this does not necessarily require stiffening the spacers against bending in all directions. Instead, the entire arrangement comprising the spacer and roller bodies inserted into it is in fact adequately resistant to bending, especially precisely to the aforementioned bending in the direction of the rolling axis, if—as is provided according to the invention—not only the lateral parts of the spacer, each with their flat side toward the roller body, are in two-dimensional contact with the end faces of the roller bodies, but also the end parts of the spacer, each with their bearing faces, are in two-dimensional contact with the rolling faces of the roller bodies. In that case, bearing faces located annularly around the roller body are available, on which the roller body rests. The roller body can therefore rest overall with virtually no play on the bearing faces. The overall arrangement thus behaves like a solid, inflexible body.

Besides the actual spacing apart of the roller bodies from one another, or in other words the guidance of the roller bodies in the direction of motion, the spacer of the invention enables precise guidance of the roller bodies transversely to the direction of motion, or in other words guidance of the orientation of their rolling axes essentially parallel to one another, and this is true even though the spacer is intrinsically not especially inflexible in all directions. As already noted, this is especially advantageous whenever rollers are used as the roller bodies, because in that case a precise location of the rolling axes, fixedly defined by the axis of symmetry of the rollers, parallel to one another can be assured. This is possible even with highly varying radii of curvature or alternating straight and curved portions of the revolution path. Tilting of the rolling axes of the roller bodies relative to one another, which is a substantial cause of wear in the case of linear devices embodied with rollers as the roller bodies, can thus be effectively suppressed.

The width of the short side of each of the lateral parts, measured essentially in the direction of the rolling axis of the roller bodies, is as a rule markedly less than the width of its flat side, measured between the long edges that define its flat side. The width is expediently defined by the spacing of the long edges from one another. Preferably, the width of the short side—on average, over the total length of the lateral parts—amounts to from one-tenth to one-third, preferably one-sixth to one-fourth, and quite particularly preferably one-fifth of the width of the flat side. It is not necessary for the long edges always to extend precisely parallel to one another; instead, it is sufficient if their mean spacing, calculated for instance as an arithmetic average of all the spacings in the longitudinal direction, meets the condition.

Preferably, the lateral parts are each curved in arclike form between the two end parts, so that the longitudinal axis of the lateral parts that defines the longitudinal direction extends in curved fashion compared to a rectilinear connection of the face ends. The curvature is such that in the deflection region of the revolution path, an approximately uniform curvature of the lateral parts of successive spacers is obtained. The course of the lateral parts thus approximately follows the course that a uniformly curved, flexible connection belt of a roller body chain would ideally take. Because of the greater rigidity of the spacers of the invention compared to the flexible connection belt of a roller body chain, however, better guidance of the roller bodies can be accomplished, especially if the roller bodies are exposed to alternating thrust loads and tensile loads. The curved form of the spacer elements, which are intrinsically rigid once roller bodies have been inserted, contributes substantially to facilitating the transition of the spacer elements from a rectilinear to a curved course of the revolution path and in particular to preventing successive spacer elements from catching on one another when their end faces collide with one another.

The curved lateral parts have one uniformly curved inner long edge and one outer long edge which is uniformly curved, beginning at the face ends of the respective lateral part, and changes into a flattened middle part, and the shape of the lateral parts is mirror-symmetrical to a center plane between the end parts, and the radii of curvatures are dimensioned such that the lateral parts, in all the portions of the revolution path, are capable of engaging a guide groove embodied in their side walls.

It is also conceivable to provide the long edges of the lateral parts with kinks, which bring about a course of the lateral parts longitudinally that deviates from the rectilinear connection of the end parts.

Preferably, the lateral parts are embodied symmetrically to a center plane between the two end parts of the spacer.

In a favorable embodiment, the lateral parts, on their flat side toward the roller body, have a shape, preferably flat or concave, that is adapted to the shape of the roller body. This brings about large-area contact of the flat side with the face end of the respective roller body, resulting in a uniformly firm "fastening" of the roller body in the pocket formed by the end parts and lateral parts, and even under load, extensive freedom from play is attainable.

On their flat side, diametrically opposite the first flat side and facing away from the roller body, the lateral parts may for instance have a convex shape. The term convex shape should be understood here to mean both an arbitrary curvature of the surface outward and an embodiment of the surface with kinks or offsets. In the case of kinks, then the other flat side can for instance be composed of a plurality of partial faces of different inclination, and the inclination of the partial faces toward the middle of the other flat side becomes increasingly less. In a preferred embodiment of this variant, the lateral parts, on the other flat side, have at least one chamfer, which connects the other flat side to one of the short sides of the applicable lateral part. The chamfer forms a bevel-like chamfer, which as desired extends all the way around, along the edges between the flat side and the adjoining short side or short sides.

The embodiment of the other flat side with at least one chamfer has advantages in the production of guide grooves for engagement by the lateral parts. When a guide groove is embodied in the boundary of the revolution channel for engagement by the lateral parts, the guide groove too can have corresponding chamfered lateral boundaries; this guide groove can therefore be embodied in such a way that no undercuts result. As a result, in a single operation together with other machining operations to be performed, the guide groove can be embodied integrally in the movably guided element of a linear device, for instance by means of a grinding wheel. This makes it possible to generate the guide groove without having to produce and assemble additional components. Nor is an additional machining step in the assembly necessary.

If the lateral parts each have a rounded form on their face ends, and the sides of the end parts that face away from the roller body are adapted to the rounding of the face ends of the lateral parts, this contributes to avoiding jamming when the end faces of two spacers contact one another during their revolution. Such collisions could occur particularly at the transition from the rectilinear load portion of the revolution path to the adjoining deflection portion.

Preferably, the two end parts are embodied mirror-symmetrically to one another—specifically, with respect to a center plane of the spacer in its longitudinal direction—and on their side toward the roller body each have a shape adapted to the rolling face of the roller body, for the sake of large-area contact therewith.

On the rib, preferably two opposed contact faces for the rolling faces of two successive roller bodies are embodied mirror-symmetrically to one another—specifically with respect to a center plane of the rib in the longitudinal direction of the spacer. If the lateral parts have a curved course, it is furthermore favorable if the contact faces for the rolling faces of the roller bodies are located on the rib in such a way that with respect to a plane that joins the axes of symmetry or rolling axes of the roller bodies inserted into the spacer, they come into contact with the roller bodies offset in the direction of the curvature of the lateral parts. This arrangement means that the ribs acting as separator elements extend all the way around in the revolution path, shifted radially outward from the center axis of the revolution path of the roller bodies. Thus in curved regions of the revolution path, they can shift radially inward somewhat relative to their axis, unhindered, without colliding with the inner boundary wall of the revolution path. It is thus assured that even when the deflection radii are narrow, the play of the roller bodies in their pockets will not undesirably increase.

Moreover, the contact face embodied on a respective end part for the rolling face of the associated roller body and the contact face embodied on the rib of the spacer for the rolling face of that roller body are preferably diametrically opposite one another with regard to the axis of symmetry or rolling axis of the roller body inserted into the spacer. Thus they form an optimal contact for holding the roller body, with the least possible play.

It has been found that an especially favorable configuration exists if precisely one rib is located in the middle between the two end parts. Then, two successive roller bodies are always inserted into one common spacer and thus fixed in terms of their position relative to one another. In this configuration, the spacer is short enough so that despite its rigidity, it can traverse even revolution path portions that describe relatively narrow radii of deflection without colliding with the boundaries of the deflection path or of an optionally provided guide groove. At the same time, however, the length of the spacer is sufficient that with the play that is within the scope of the production tolerances between the lateral guide walls of the revolution path or guide groove and corresponding bearing faces on the face ends of the roller bodies and on the lateral parts of the spacer, the rolling axes of the roller bodies can be reliably kept parallel to one another.

The spacer can be economically made from plastic, for instance. This is advantageous above all because of the more-favorable sliding performance of the rolling faces of the roller bodies with plastic, compared to metal. The overall lesser rigidity of a spacer made of plastic, compared to a spacer made from metal, is more than compensated for by the additional stiffening of the spacer in collaboration with the roller bodies held in it extensively without play.

The invention is applicable above all to linear devices, especially linear guides or linear drives, which include an element that is movable along a linear guide element by rolling motion of roller bodies. In such linear devices, at least some of the roller bodies can be inserted into a spacer of the type defined, but preferably all the roller bodies are inserted into such spacers, which then extend all the way around in a loose succession in the revolution path. It has already been pointed out that in these applications, it is important that on the one hand the stiffest possible guide structure can be found, but on the other the guide structure must also be movable enough to be able to adapt to varying path radii.

The revolution path for the roller bodies is as a rule embodied in the movably guided element of the linear device, such as the guide carriage of a linear guide. Often, it is furthermore provided that at least in some portions, a guide groove is machined into a wall that defines the revolution path. At least one of the lateral parts of the spacer can then engage this guide groove, in order to accomplish lateral guidance of the roller bodies and/or to prevent the spacer, with the roller bodies located in it, from falling out as soon as the movably guided element is pulled off the linear guide element.

The guide groove may be embodied either in a separate part or preferably at least in some portions it may be embodied integrally in the movably supported element. This is especially favorable whenever undercuts in the movably guided part need not be embodied in order to embody the guide groove, because in that case the guide groove can be machined in a single operation together with the embodiment of the running face for the roller bodies. To make it possible to avoid undercuts, the guide groove preferably has chamfered side walls, which form an obtuse angle relative to the bottom of the groove. This is possible whenever the lateral parts of the spacer, on their flat sides facing away from the roller body, also have such chamfers.

A guide groove of the type described can be considered above all for the load portion of the revolution path, in which the roller bodies roll between a running face formed on the movably guided element and a running face formed on the linear guide element. The roller bodies are guided in the load portion laterally each by one side wall embodied in the movable element. It is intrinsically sufficient to provide a guide groove on only one of the side walls. It is understood, however, that it is better to provide a guide groove on both side walls diametrically opposite one another. In that case, for the sake of the simplest possible manufacture, one of the two guide grooves can be embodied integrally in the guide carriage, while the guide groove located on the opposite side wall is embodied on a separate component that is placed on the movable element.

If the spacer has curved lateral parts, then it is preferably located in the revolution path in such a way that the curvature of the lateral parts follows the curvature of the revolution path of the roller bodies.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
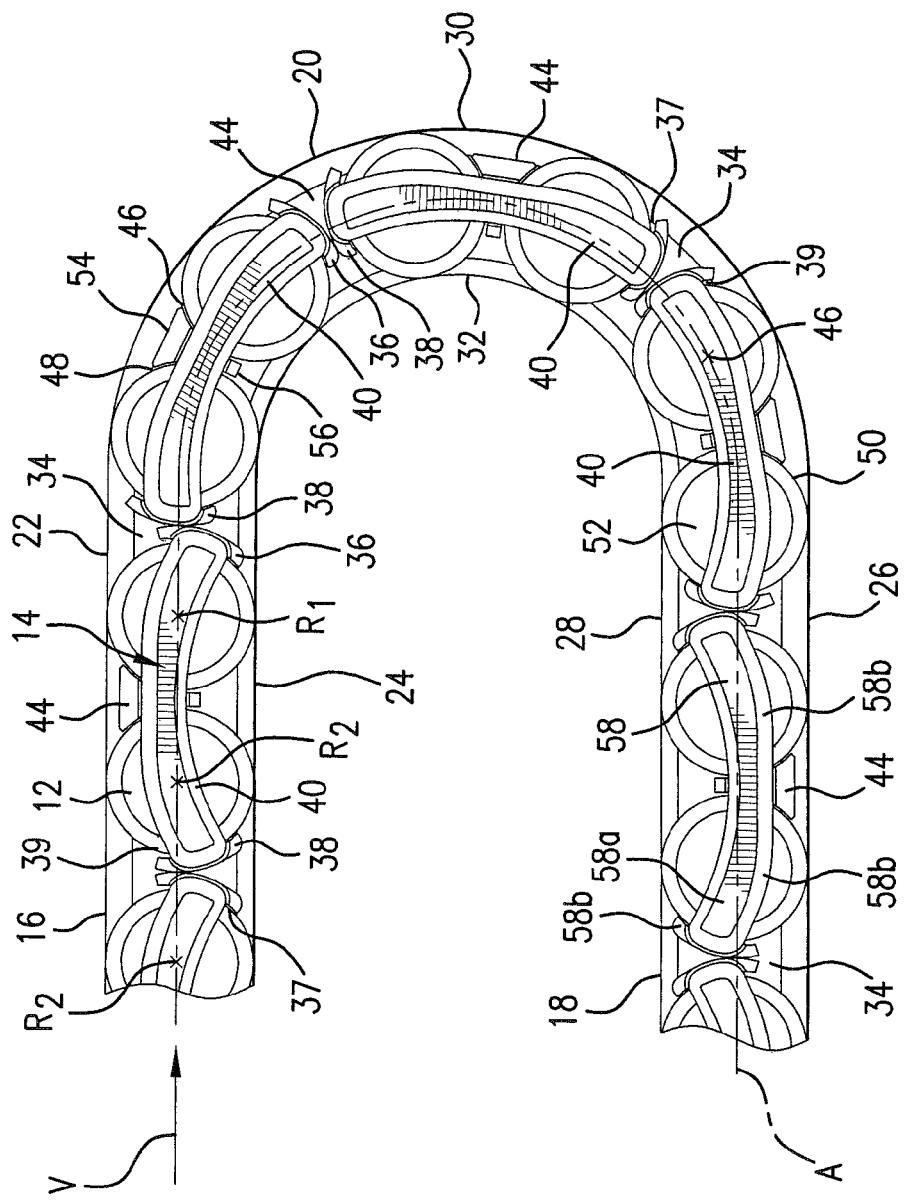
FIG. 1 is a schematic plan view on a portion of a revolution path of a linear guide, in which rollers as roller bodies are guided in one embodiment of spacers according to the invention.
Figure 2:
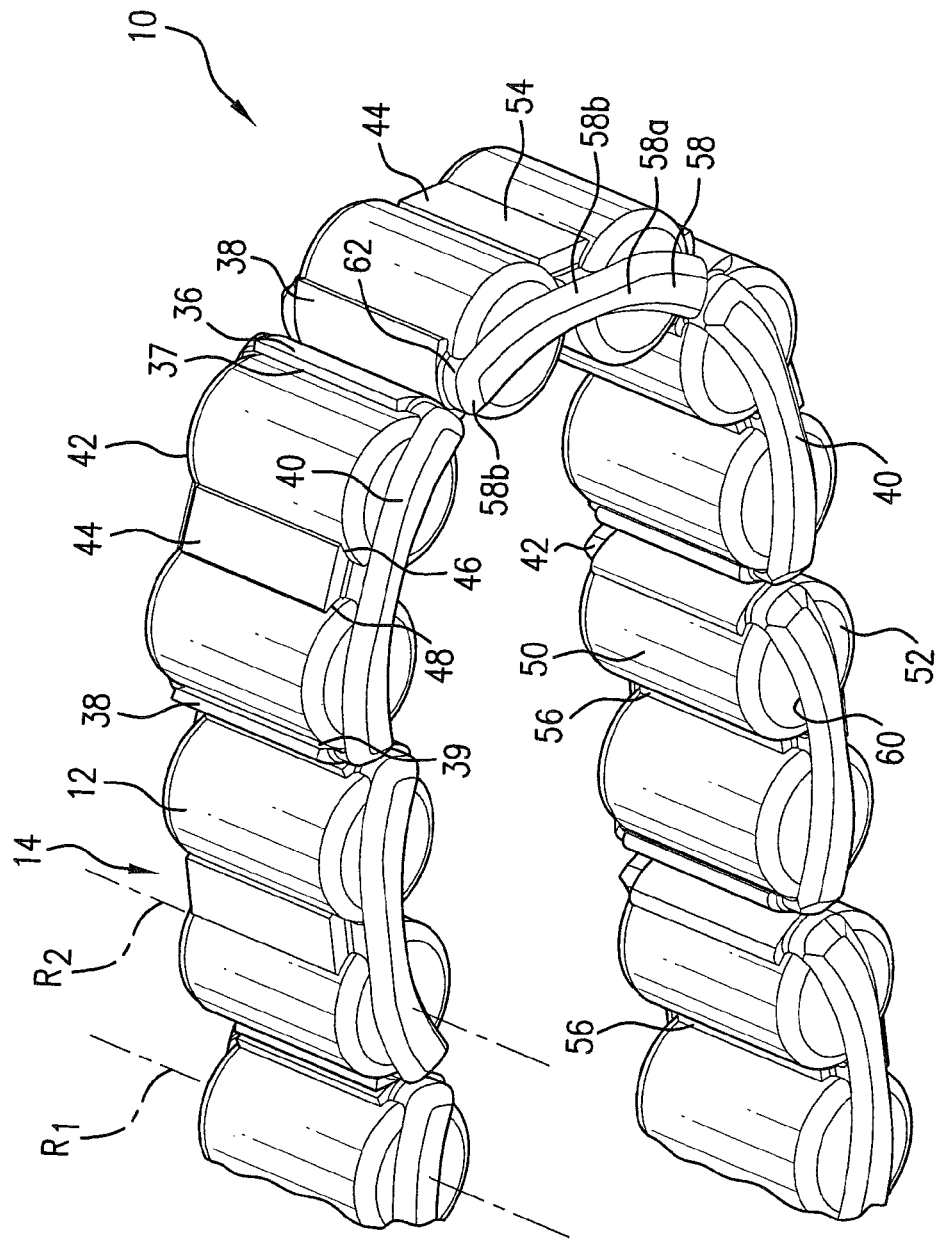
FIG. 2 is a perspective view of the spacers of FIG. 1, following one another in the linear guide, with the boundaries of the revolution path not shown.

In FIG. 1, a plan view on a portion of a revolution path 10 of a linear guide is shown schematically; in the linear guide, rollers 12 as roller bodies are guided in spacers according to the invention (generally identified by reference numeral 14). FIG. 2, for clarification, shows the successive spacers 14 in the linear guide 10 of FIG. 1 with rollers 12 inserted, in perspective, with the boundaries of the revolution path not shown for the sake of making the spacers more visible. The revolution path includes two rectilinear path portions 16, 18, one of which forms the load portion and the other the return portion of the roller bodies 12. Between the two rectilinear path portions 16, 18 is a curved deflection portion 20. A further deflection portion, diametrically opposite this, is not shown.

The revolution path shown in FIG. 1 is embodied in the body of a movably guided guide carriage of the linear guide 10, with the condition that in the load portion (for example, the upper rectilinear portion 16 in FIG. 1), the outer boundary (marked 22 in FIG. 1), that is, "outer" in terms of the direction of revolution, on which the roller bodies 12 roll is formed by the guide rail. All the other running faces, namely the inner boundary wall 22, in terms of the direction of revolution, of the load portion and the boundary walls 24, 26, 28, 30, 32 of the return portion 18, and the deflection portions 20 are embodied in the guide carriage. One guide groove 34 is embodied on each of the side walls, connecting the running faces, of the revolution path, toward which walls the end faces 52 of the roller bodies 12 are oriented.

The spacers 14 each include one front end part 36 and one rear end part 38, in terms of the direction of motion of the roller bodies 12 (indicated as an example by the arrow v in FIG. 1). The two end parts 36, 38 are connected to one another by two lateral parts 40, 42 (in FIG. 1, only one of these lateral parts is visible), which are each guided laterally past the boundary walls, provided by the guide groove 34, on the end faces 52 of the roller bodies 12.

Each of the end parts 36, 38 has a respective contact face 37, 39, on which the rolling face 50 of the respective roller body 12, inserted into the spacer 14, rests. The contact faces 37, 39 are adapted to the shape of the rolling faces 50. Accordingly, in the embodiment shown with roller-shaped roller bodies 12, they have the shape of jacket faces of a cylinder.

The lateral parts 40, 42 are embodied in platelike form. They each have one outer and one inner flat side 58, 60 as well as a short side 62. The inner flat side 60 of the lateral parts 40, 42 rests on the respective face end 52, oriented toward it, of the roller bodies 12. The diametrically opposite outer flat side 58 engages the guide groove 34, as described in further detail hereinafter.

The lateral parts 40, 42 are embodied as curved longitudinally. The spacers 14 are located such that the bending of the lateral parts 40, 42 matches the direction in which the roller bodies 12 are deflected. Thus the bending radius of the lateral parts 40, 42 is approximately equivalent to the bending radius of the revolution path in the deflection portion 20, so that in the deflection portion 20, the lateral parts 40, 42 each follow one another along an imaginary, uniformly curved arc.

Successive spacers 14 can each enter, with their respective front end part 36, into contact with the rear end part 38 of the respective preceding spacer 14. The end parts 36, 38, because of the curved shape of the lateral parts 40, 42, touch on their radially outer ends in the linear portions 16, 18 of the revolution path and move along a line that is offset radially inward from the axis A of the revolution path (shown in dot-dashed lines in FIG. 1). In the curved path portions (only 20 is shown in FIG. 1), however, they are tilted relative to one another in such a way that they now touch one another with their radially inner ends. Thus their path essentially follows the axis A of the revolution path. Hence the face ends 36, 38 of successive spacers 14, 14 shift in the radial direction relative to one another in the transition regions between the linear portions 16, 18 of the revolution path and the curved portions 20 of the revolution path.

In this shifting action, jamming or catching of the face ends 36, 38 of successive spacers 14, 14 can occur. To avoid that, the face ends 36, 38 are embodied in shell-like fashion in the radial direction on their outer ends, with a uniform curvature, and have a minimum height in the radial direction that is greater, the shorter the deflection radius of the revolution path is in the curved portions 20. Moreover, on their face ends, the lateral parts 40, 42 are embodied as gently rounded, so as to adapt essentially to the shell shape of the outer face of the end parts 36, 38.

The closed annular structure formed by the end parts 36, 38 and lateral parts 40, 42 of a spacer 14 is further subdivided by a rib 44, which connects the two lateral parts 40, 42 precisely at the center between the end parts 36, 38. The rib 44 extends essentially parallel to the end parts 36, 38 and thus orthogonally to the direction of motion v and parallel to the rolling axis $R_1$, $R_2$ of the roller-shaped roller bodies 12, which at the same time is their sole axis of symmetry. On the rib 44, viewed in the direction of motion v of the roller bodies, one front and one rear contact face 46, 48, respectively, is embodied, which is adapted to the shape of the roller bodies 12, and on which the rolling face 50 of a roller body 12, inserted into the spacer 14, rests. Thus in the closed ring structure of a spacer 14, two pockets each for receiving one roller body 12 are formed by the rib 44. The roller body 12 in the pocket contacts at least four contact faces in four different directions; namely, with each of its end faces 52, it contacts a respective contact face of the lateral part 40, 42 (flat side 60), and with its rolling face 50, it contacts a contact face 37, 39 of the respective end part 36, 38, and a respective contact face 46, 48 of the rib 44.

The two contact faces 46, 48 of the rib 44 contacting the roller body 12 are connected to one another by one radially outer face 54 and one radially inner face 56, which are essentially parallel to one another; the radially outer face 54 is larger than the diametrically opposed radially inner face 56. The contact faces 46, 48 of the rib 44, in the rectilinear portions 16, 18 of the revolution path, thus rest on the rolling faces 50 of the roller body 12 in a manner that is offset radially outward relative to the axis A of the revolution path. In the curved portions, however, the ribs 44 shift somewhat toward the axis A.

It is also indicated in FIG. 1 that in the embodiment shown there of the spacer 14, each of the lateral parts 40, 42, on its flat side 58 oriented toward the guide groove 34, is embodied with a raised central face portion 58a, which by way of chamfered portions 58b extending all the way around along the edges of the flat side 58, merge with the respective short side 62 of the lateral part 40, 42.

As described further hereinafter, the lateral parts 40, 42, with their short sides 62, protrude laterally past the end faces 52 of the roller bodies 12 and engage the guide groove 34. The shape of the spacers 14, and above all the curvature of their lateral parts 40, 42 and the disposition of the contact faces of the end parts 36, 38 and of the rib 44 relative to one another, are dimensioned in such a way that when the spacers 14 move in the revolution path, the lateral parts 40, 42 do not collide at any point with the boundary wall of the guide groove 34. From FIG. 1, it can be seen that if the curvature is too great, the lateral parts 40, 42, with their two long ends, can collide with the inner boundary of the guide groove 34 when the spacers 14 are moving in the rectilinear portions of the revolution path, and if the curvature is too little, with their two long ends they can collide with the outer boundary of the guide groove 34 when the spacers 14 are moving in the curved portions of the revolution path. Moreover, there is the risk that with their outer long edges 64, the lateral parts 40, 42 will collide with the outer boundaries of the guide groove 34. To prevent this, it can be helpful for the outer long edge 64 of each of the lateral parts 40, 42 to be flattened somewhat in the middle region 64c, as is shown in FIGS. 1 and 2 (see also FIG. 5).

Figure 3:
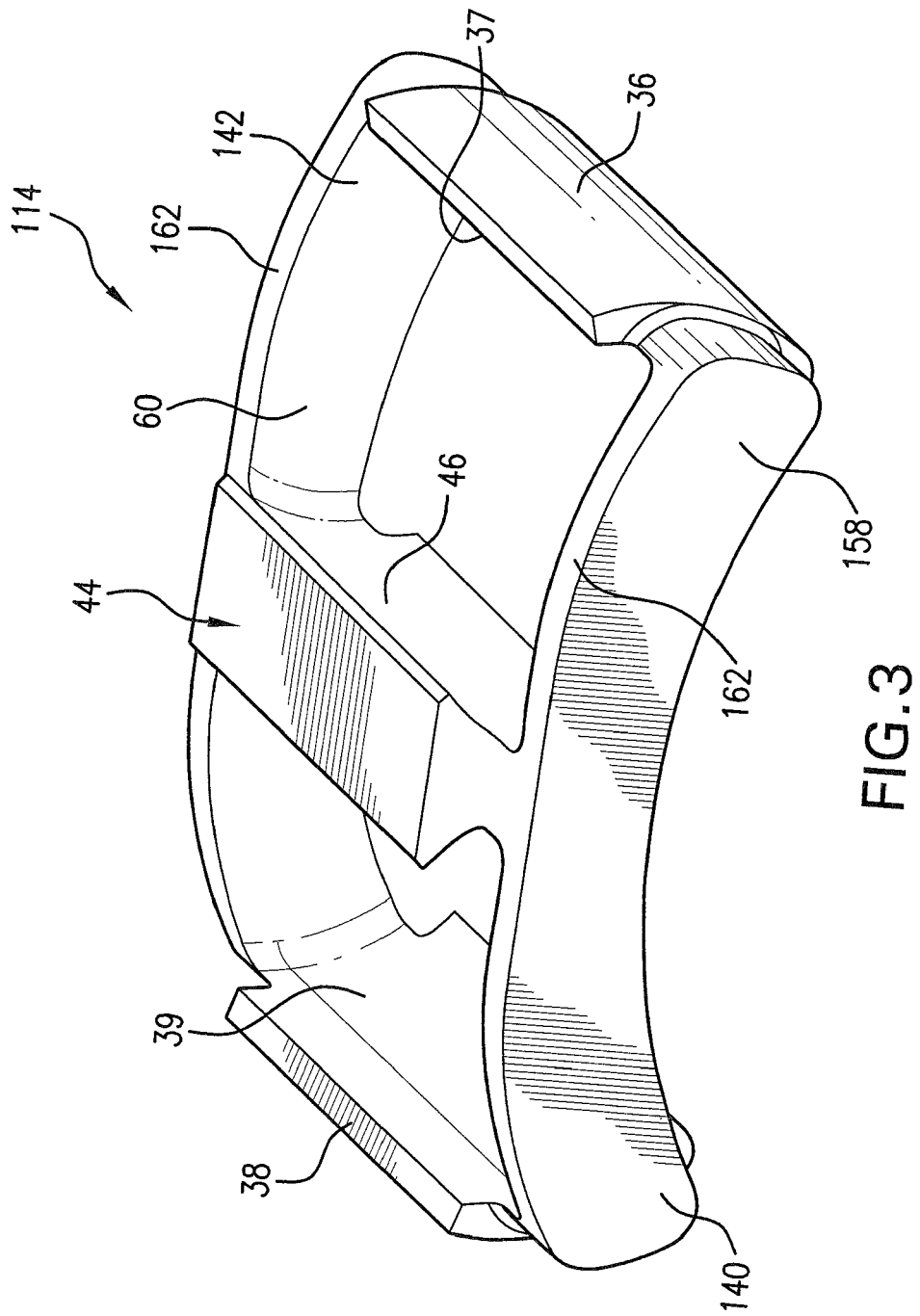
FIG. 3 is a perspective view of an alternative embodiment for a spacer.
Figure 4:
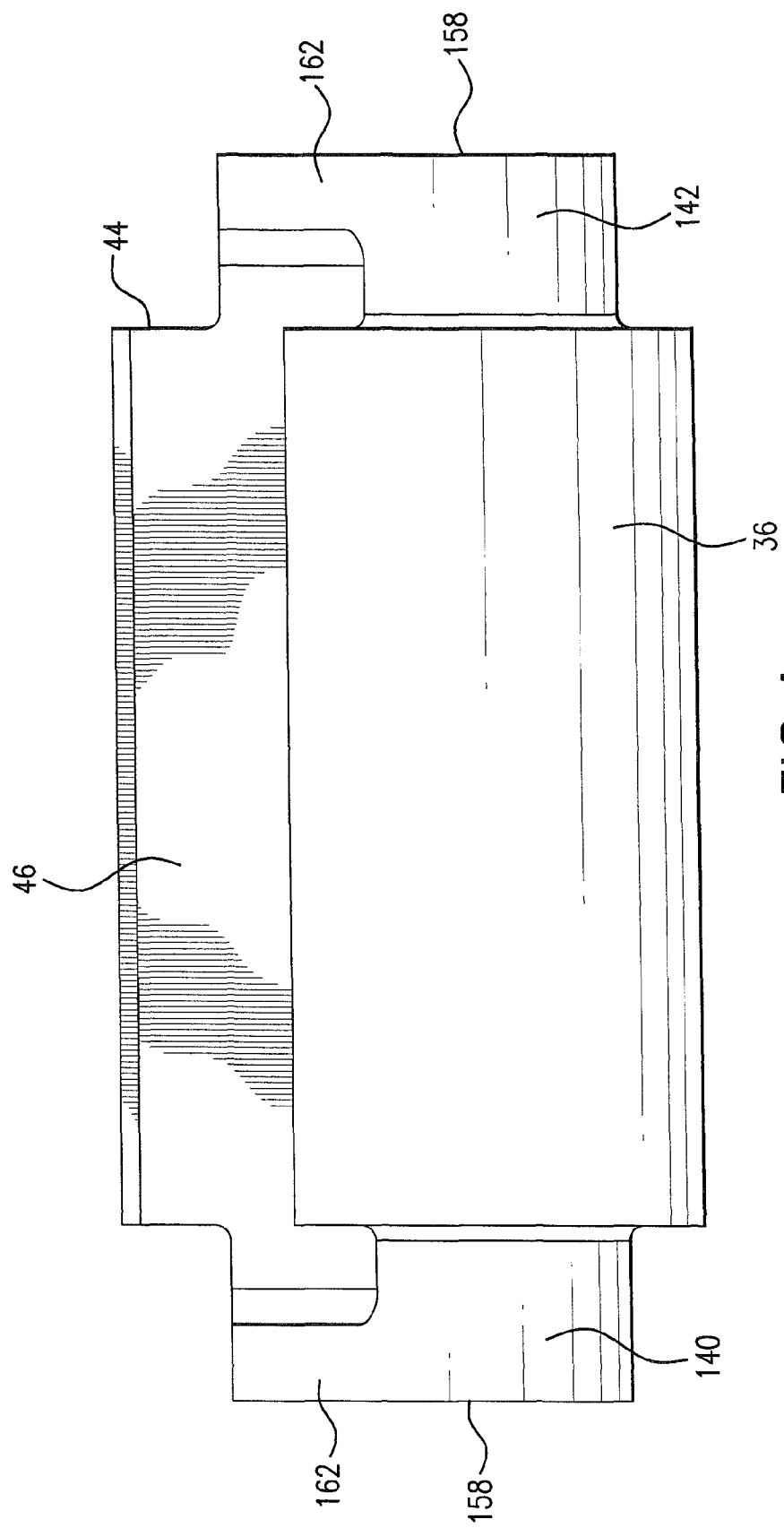
FIG. 4 is a side view of the spacer of FIG. 3, seen from the right in terms of FIG. 3.

FIG. 3, in perspective, shows an alternative embodiment 114 for a spacer of the invention. FIG. 4 shows the same spacer 114 in a side view from the right in terms of FIG. 3. Finally, FIG. 5 also shows this same spacer in a side view from below in terms of FIG. 3. The spacer 114 differs from the spacer 14 shown in FIGS. 1 and 2 only in terms of the embodiment of its lateral parts 140 and 142, with a completely plane outer flat side 158 without chamfers. All the other characteristics of the spacer 114 and in particular of its lateral parts 140, 142 are identical to those of the embodiment shown in FIGS. 1 and 2. This is also true for the disposition of the spacers 114 in a linear guide, which is completely identical to that shown in FIGS. 1 and 2. In the spacer shown in FIGS. 3 through 5, with the exception of the lateral parts 140, 142, its outer flat sides 158 that engage the guide groove 34, and its short sides 162, all the components are identified by the same reference numerals as in FIGS. 1 and 2. To avoid repetition, instead of describing all these elements on their own, the description of all these elements, with the exception of the outer flat sides 158, with regard to FIGS. 1 and 2 is expressly referred to.

Figure 5:
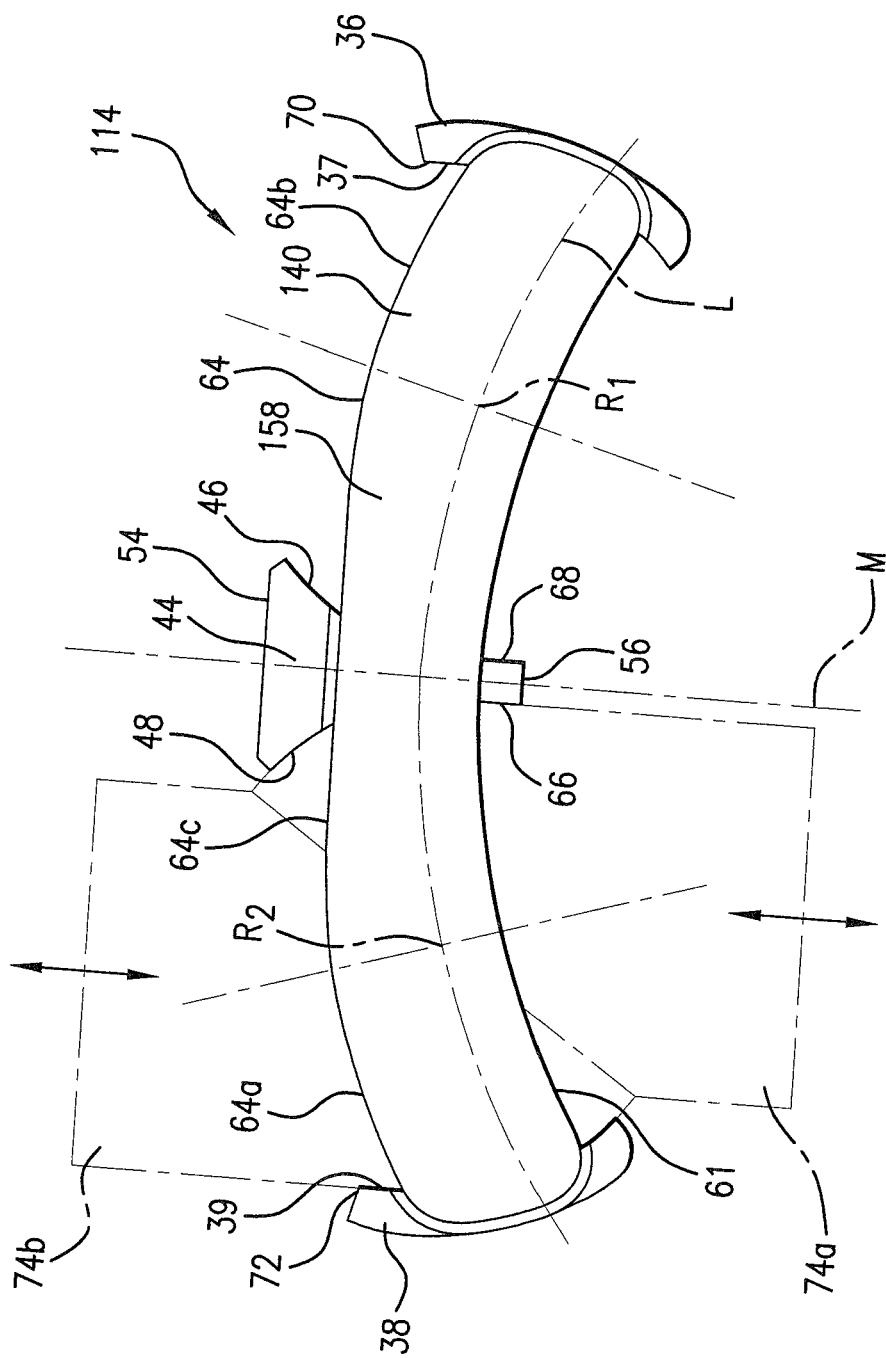
FIG. 5 is a side view of the spacer of FIG. 3, seen from below in FIG. 3.

In conjunction with FIG. 5, the geometric position of the individual elements of a spacer 14, 114 of the invention will now be described in detail. In FIG. 5, the spacer 114 of FIGS. 3 and 4 is shown. All the embodiments that follow, however, apply identically to the spacer 14 of FIGS. 1 and 2.

In the spacer 114 of FIG. 5, the lateral part 140, embodied symmetrically to a center plane M, extends curved in an arc between the two end parts 36, 38, in a longitudinal direction L (in dot-dashed lines in FIG. 5). Its lower long edge 61, in terms of FIG. 5, which after the insertion into a revolution path of a linear guide is oriented radially inward, is likewise curved in an arc. Its diametrically opposed long edge 64, with portions 64a, 64b, 64c (at the top in FIG. 5), which after insertion into a revolution path of a linear guide is oriented radially outward, likewise extends with uniform curvature in both of its peripheral portions 64a, 64b. However, the two curved portions 64a, 64b merge smoothly with a central, flattened portion 64c, which is embodied nearly rectilinearly. The radius of curvature of the curved portions 64a, 64b is somewhat less than the radius of curvature of the inner long edge 61. By means of this shape, on the one hand a sufficiently pronounced curvature to achieve a smooth transition from rectilinear portions to curved portions of the revolution path can be obtained; on the other hand, the chamfering also prevents the lateral part, with its outer long edge, from colliding with the boundary of the guide groove.

The contact faces 48 and 39 and the contact faces 46 and 37, each associated with the same respective roller body on the rib 44 and on the end parts 38 and 36 are diametrically opposite one another with regard to the respective rolling axis $R_1$ and $R_2$, which coincides with the axis of symmetry of the roller body 12. Both contact faces are adapted essentially to the shape of the rolling face 50 of the roller body 12 and are thus embodied cylindrically. However, on one side, the cylindrical part is also adjoined by a short rectilinear piece 66, 68, 70, 72. This short extension piece assures that when the spacers are produced, preferably integrally of plastic by injection molding, an injection molding tool for embodying the pockets (in FIG. 5, indicated by respective dot-dashed boundaries 74a and 74b for the left-hand pocket) can move inward and outward in the direction indicated by respective double arrows without hindrance, since no undercuts are formed. The linear extension pieces 66, 68, 70, 72—at least when the play of the roller bodies is negligible—have no influence on the hold of the roller bodies in the pockets. The length of the linear extension pieces 66, 68, 70, 72 should furthermore be dimensioned such that the size of the resultant opening, through which the corresponding roller body must be introduced upon assembly, is only enough smaller than the diameter of the roller body that as the roller body is pressed into it, no plastic deformation of the spacer occurs.

Figure 6:
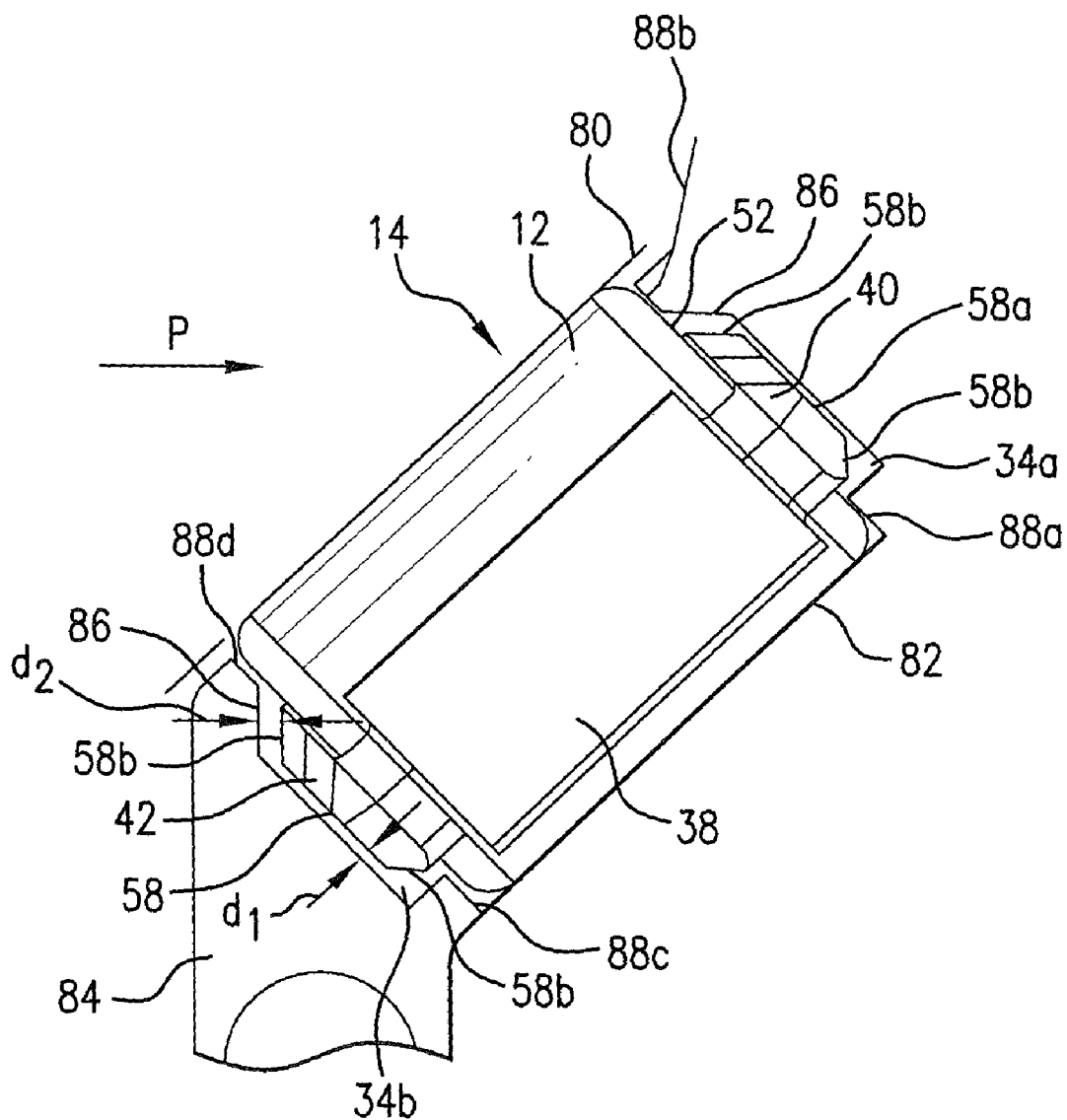
FIG. 6, in a view corresponding to FIG. 4, is a view of the spacer of FIGS. 1 and 2 in which in addition the position of the revolution path that is embodied in a movably guided element of a linear device is shown along with guide grooves.

FIG. 6 shows a view of the spacer of FIGS. 1 and 2, in a view corresponding to FIG. 4. Thus for the description of the individual elements of the spacer, the above descriptions can be referred to. The spacer 14 in FIG. 6 is equipped with roller bodies 12 and is shown in a position in which the roller bodies 12 roll in the load portion of a revolution path between a first running face 80, which is embodied on a guide rail not identified by reference numeral, and a second running face 82, which is embodied in a guide carriage, likewise not provided with a reference numeral, that is guided movably relative to the guide rail. The spacer 14 includes two end parts (of which only the rear end part 38 is shown in FIG. 6) and two lateral parts 40, 42. Each of the lateral parts 40, 42 engages a respective guide groove 34a, 34b, and these guide grooves are each embodied on the guide carriage 82. In the embodiment shown, the flat sides 58, facing away from the end faces 52 of the roller body 12, of the lateral parts 40, 42 are embodied with raised central portions 58a and laterally encompassing chamfers 58b. The guide grooves 34a and 34b therefore have correspondingly chamfered lateral boundaries 86, which are diametrically opposite the chamfers 86.

The guide groove 34a shown on the right in FIG. 6 is machined integrally with the body of the guide carriage, for instance being formed in it by grinding. For this guide groove 34a, it is especially advantageous that the lateral boundary 86 of the guide groove, because of the chamfers 58b of the lateral part 40, need not be at a right angle to the bottom of the groove but instead rises with a shallower angle of inclination, since thus, compared to the engagement direction of a grinding wheel (generally from the direction of the arrow P in FIG. 6), with which the lb face of the guide carriage must necessarily be machined anyway, no undercuts are formed by the guide groove 34a, and the groove can be machined in the same operation with the embodiment of the contours, on the applicable side of the guide carriage.

The diametrically opposed lateral boundary wall of the load portion of the revolution path is preferably not embodied integrally with the body of the guide carriage, but instead is embodied in a separate plastic part 84 that is placed on the body of the guide carriage.

In the variant shown in FIG. 6, the lateral parts 40, 42 rest in the guide grooves 34a, 34b with play d1 relative to the bottom of the guide groove and with play d2 relative to the lateral boundaries of the guide grooves 34a, 34b. In this case, the task of the grooves is above all to secure the roller bodies against falling out when the guide carriage is pulled off from a guide rail, because the grooves, by way of the engagement of the lateral parts 40, 42, secure the spacers 14, and the spacers in turn keep the roller bodies 12 in the pockets. The lateral guidance of the roller bodies 12 for preventing tilting of their rolling axes relative to one another is assured in this variant primarily by side wall portions 88a, 88b, 88c, 88d of the revolution path that are located beside the guide grooves 34a, 34b. These side walls 88a, 88b, 88c, 88d are in fact in engagement with only slight play with the end faces 52, oriented toward them, of the roller bodies 12. The primary advantage of this embodiment is that in embodying the revolution path and producing the roller bodies, only the tolerances in terms of widths determine the play, but the production tolerance of the width of the short side need not be taken into account.

Figure 7:
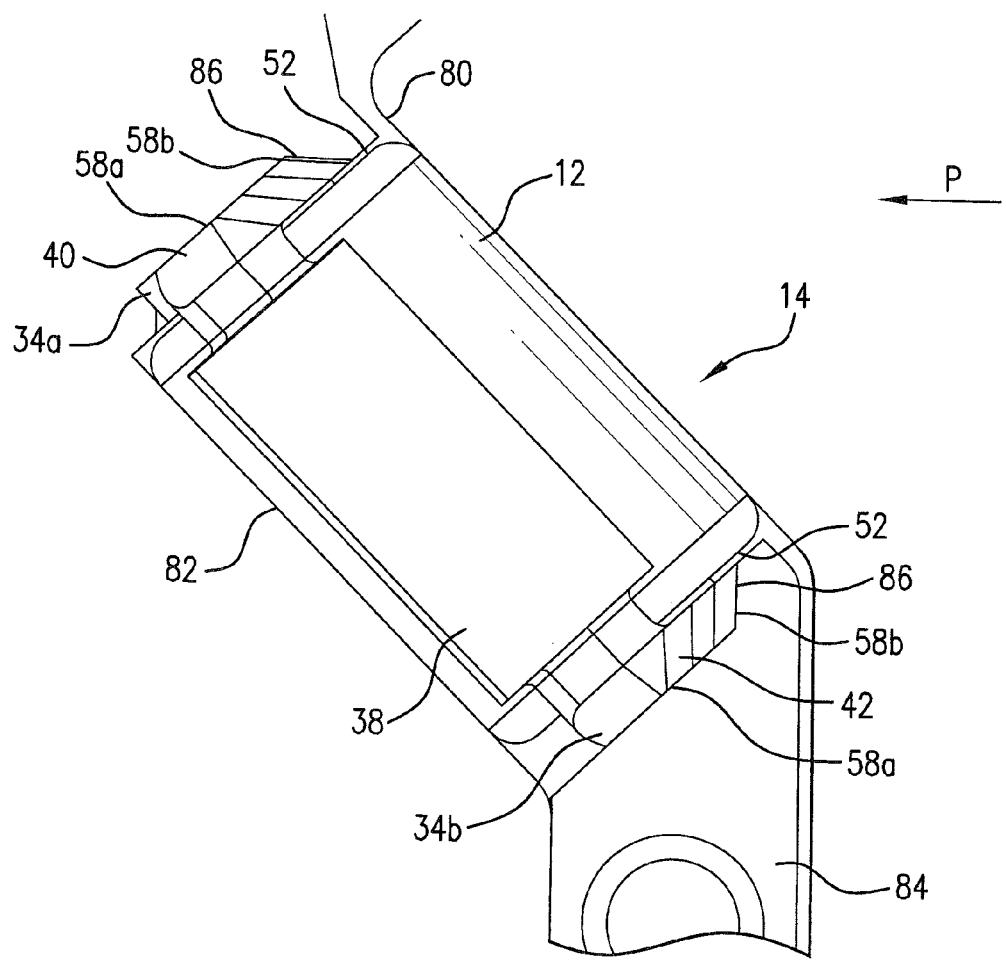
FIG. 7 shows a variant of the spacer of FIG. 6.

FIG. 7 by comparison shows an alternative variant to that shown in FIG. 6 for the disposition of the spacer 14 in the load portion of the revolution path. This variant will be described below only in terms of its differences from the variant of FIG. 6. Otherwise, see the description of FIG. 6.

In the arrangement of FIG. 7, the engagement of the lateral parts 40, 42 with the guide grooves 34a, 34b, in addition to securing the roller bodies 12 against falling out, also serves the purpose of laterally guiding the spacers 14, with the roller bodies 12 held in them, and thus serves to suppress tilting of the rolling axes of the roller bodies. For this reason, in the embodiment of FIG. 7, the engagement of the lateral parts 40, 42 with the corresponding guide groove 34a, 34b takes place with the least possible play. Additional guide portions between the end faces 52 of the roller bodies 12 and the lateral boundary walls of the revolution path are not necessary.

Figure 8:
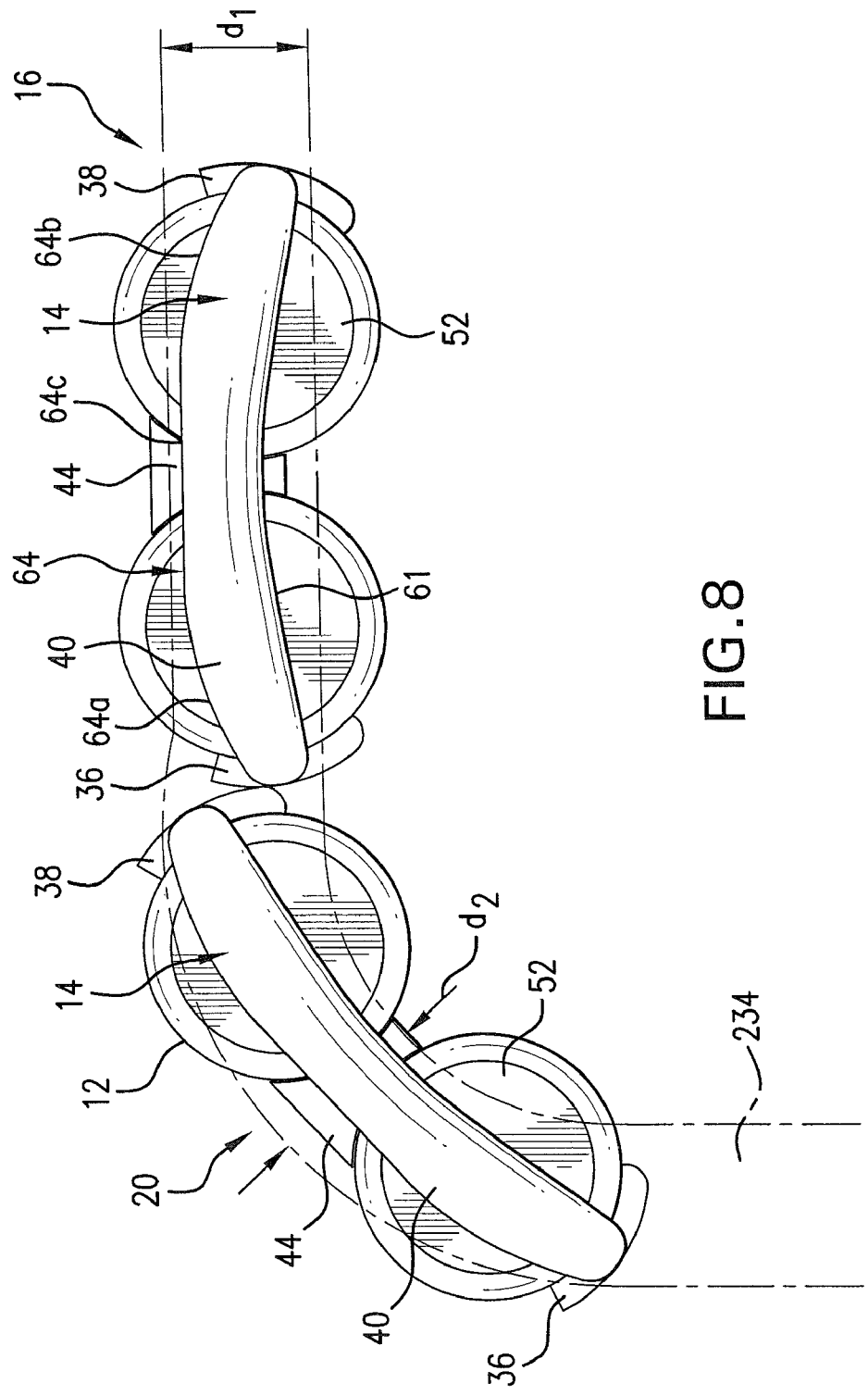
FIG. 8 is a schematic plan view on a portion of a revolution path of a linear guide with a slightly modified guide groove.

FIG. 8 schematically shows a plan view on a portion of a revolution path of a linear guide with a slightly modified guide groove 234 (with the boundary walls of the revolution path not shown). Except for the guide groove 234, the variant shown in FIG. 8 is identical to the embodiment shown in FIG. 1. For this reason, all the components, with the exception of the guide groove 234, in FIG. 8 have the same reference numerals as in FIG. 1. Below, only the guide groove 234 will be described in detail; for the description of the other components, see the above descriptions.

The width of the guide groove 234, in the rectilinear portion 16 of the revolution path (this width is marked d1 in FIG. 8) is less than the corresponding width of the guide groove in the curved portion 20 of the revolution path (that width is marked d2 in FIG. 8). The lesser width d1 of the guide groove 234 in straight revolution path portions permits a closer contact of the end faces of the roller bodies 12 with the lateral boundary wall of the revolution path and the laterally protruding lateral parts 14 in the guide groove 234. The overall result is thus improved lateral guidance. To enable keeping the groove width as slight as possible in the rectilinear part of the revolution path, the radially outer edge 64 of the lateral part 14, when the spacer is located in the revolution path, has the flattened face 64c, and the radius of curvature of the two curved portions 64a, 64b of the outer edge 64 is somewhat greater than the radius of curvature of the diametrically opposed edge 61 on the inside of the spacer.

It will be understood that each of the elements described above, or two or more together, may also find a useful application in other types of constructions differing from the type described above.

While the invention has been illustrated and described as embodied in a spacer, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A spacer for roller bodies which are guided in a roller bearing and which have an axis of symmetry defining a rolling axis about which they roll in a revolution path of the roller bearing, the spacer comprising:

two diametrically opposed, spaced-apart end parts which are each located transversely to a direction of motion of the roller bodies and have contact faces for rolling faces of the roller bodies;

two diametrically opposed, space-apart lateral parts, wherein each of said lateral parts connects said two end parts, has a plate shape with a first side extending transversely to the rolling axis of the roller bodies for contact with the roller bodies and second, short sides extending substantially in a direction of the rolling axis of the roller bodies, and is stiffened with regard to bending substantially orthogonally to the rolling axis of the roller bodies so that in motion along the revolution path, each of said lateral parts essentially maintains its shape; and at least one rib connecting said two lateral parts between said two end parts and having contact faces for the rolling faces of two successive ones of the roller bodies, wherein said lateral parts extend in curved fashion between said two end parts, and wherein said curved lateral parts have one uniformly extending inner long edge and one outer long edge which is uniformly curved, beginning at face ends of a respective one of said lateral parts, and changes into a flattened middle part, and a shape of said lateral parts is mirror-symmetrical to a center plane between said end parts, and radii of curvatures are dimensioned such that said lateral parts in all portions of the revolution path are engageable with a guide groove provided in side walls of said revolution path.

2. A spacer as defined in claim 1, wherein said short sides of each of said lateral parts has a width which is measured substantially in the direction of the rolling axis of the roller bodies and is less than a width of the first side measured between long edges that define the first side.

3. A spacer as defined in claim 2, wherein the width of each of said short sides, on average, over a total length of said lateral parts, amounts to from one-tenth to one-third of the width of said first side.

4. A spacer as defined in claim 3, wherein the width of each of said short sides amounts to one-sixth to one-fourth of the width of said first side.

5. A spacer as defined in claim 2, wherein the width of each of said short sides is one-fifth of the width of said first side.

6. A spacer as defined in claim 1, wherein said lateral parts on a side oriented toward the roller bodies has a shape that is adapted to a shape of the roller bodies for an area contact with the roller bodies.

7. A spacer as defined in claim 6, wherein said shape of said lateral parts on the first side oriented toward the roller bodies is selected from the group consisting of a flat shape and a concave shape.

8. A spacer as defined in claim 6, wherein said lateral parts on a flat side located diametrically opposite to said first flat side and facing away from the roller bodies has a convex shape.

9. A spacer as defined in claim 8, wherein said lateral parts on the flat side located diametrically opposite to the first flat side have at least one chamfer which connects another flat side to one of the short sides of a respective one of said lateral parts.

10. A spacer as defined in claim 1, wherein said lateral parts on each of their face ends have a rounded shape, and sides facing away from the roller body of said end parts are adapted to a rounding of the face ends of said lateral parts.

11. A spacer as defined in claim 1, wherein said two end parts are mirror-symmetrical to one another, and on each side oriented toward the roller body said two end parts have a contact face which a shape adapted to the rolling face of the roller body for an area contact with the roller body.

12. A spacer as defined in claim 1, wherein on said rib two opposed contact faces for the rolling faces of two successive ones of the roller bodies are provided mirror-symmetrically to one another and located such that relative to a plane connecting axes of symmetry of the roller bodies inserted into the spacer, the two opposed contact faces come into contact with the roller bodies in offset fashion in a direction of curvature of said lateral parts.

13. A spacer as defined in claim 1, wherein a contact face provided on a respective one of said end parts for the rolling face of an associated one of the roller bodies and a contact face provided on said rib for the rolling face of that roller body are diametrically opposite to one another with regard to an axis of symmetry of the roller body inserted into the spacer.

14. A spacer as defined in claim 1, wherein said rib is located in a middle between said two end parts.

15. A spacer as defined in claim 1, wherein said spacer is composed of plastic.

16. A spacer as defined in claim 1, wherein said spacer for roller bodies which are guided in a roller bearing is configured as a spacer for roller bodies in a device selected from the group consisting of a linear guide and a linear drive.

17. A linear device, comprising:
a linear guide element;
a plurality of roller bodies providing a rolling motion;
an element supported movably, longitudinally of said linear guide element under conditions of the rolling motion of said roller bodies; and
a spacer in which at least some of said roller bodies are inserted, said spacer including two diametrically opposed, spaced-apart end parts which are each located transversely to a direction of motion of the roller bodies and have contact faces for rolling faces of the roller bodies; two diametrically opposed, space-apart lateral parts, wherein each of said lateral parts connects said two end parts, has a plate shape with a first side extending transversely to the rolling axis of the roller bodies for contact with the roller bodies and short sides extending substantially in a direction of the rolling axis of the roller bodies, and is stiffened with regard to bending substantially orthogonally to the rolling axis of the roller bodies so that in a motion along the revolution path, each of said lateral parts it essentially maintains its shape; and at least one rib connecting said two lateral parts between said two end parts and having contact faces for the rolling faces of two successive ones of the roller bodies,
wherein said lateral parts extend in curved fashion between said two end parts, and wherein said curved lateral parts have one uniformly extending inner long edge and one outer long edge which is uniformly curved, beginning at face ends of a respective one of said lateral parts, and changes into a flattened middle part, and a shape of said lateral parts is mirror-symmetrical to a center plane between said end parts.

18. A linear device as defined in claim 17, wherein a revolution path for said roller bodies is provided in a moving part, and a guide groove is formed at least in some portions in a wall that defines said revolution path, wherein said guide groove is engaged by at least one of the lateral parts of said spacer.

19. A linear device as defined in claim 18, wherein said guide groove is provided in at least some portions integrally with said movably supported element.

20. A linear guide as defined in claim 17, wherein said lateral parts of said spacer are curved and located in such a way that a curvature of said lateral parts follows a curvature of the revolution path of said roller bodies.

* * * * *